United States Patent
Antchak et al.

(10) Patent No.: US 7,591,357 B2
(45) Date of Patent: *Sep. 22, 2009

(54) CRANKSHAFT TORQUE MODULATOR

(76) Inventors: John Antchak, 2015 Grand Vista Court, Innisfil, Ontario (CA) L9S 4A6; James W. Dell, 33 Crawford Rose Dr., Aurora, Ontario (CA) L4G 4P3; Bert Mevissen, 53 Holden Dr., Nobleton, Ontario (CA) L0G 1N0

( * ) Notice: Subject to any disclaimer, the term of this patent is extended or adjusted under 35 U.S.C. 154(b) by 0 days.

This patent is subject to a terminal disclaimer.

(21) Appl. No.: 10/542,625

(22) PCT Filed: Feb. 4, 2004

(86) PCT No.: PCT/CA2004/000145

§ 371 (c)(1),
(2), (4) Date: Jul. 19, 2005

(87) PCT Pub. No.: WO2004/070225

PCT Pub. Date: Aug. 19, 2004

(65) Prior Publication Data

US 2006/0144664 A1    Jul. 6, 2006

Related U.S. Application Data

(60) Provisional application No. 60/445,125, filed on Feb. 4, 2003.

(51) Int. Cl.
*F16D 47/04* (2006.01)
*F16D 41/20* (2006.01)
*F16H 55/36* (2006.01)

(52) U.S. Cl. .................. 192/55.5; 192/41 S; 192/81 C; 474/70; 474/74

(58) Field of Classification Search .................. 192/55.5
See application file for complete search history.

(56) References Cited

U.S. PATENT DOCUMENTS

| 3,249,190 | A | * | 5/1966 | Botnick ..................... 192/81 R |
| 5,598,913 | A | * | 2/1997 | Monahan et al. ........... 192/41 S |
| 6,044,943 | A | | 4/2000 | Bytzek et al. |
| 6,083,130 | A | | 7/2000 | Mevissen et al. |
| 2005/0250607 | A1 | * | 11/2005 | Jansen et al. ................... 474/74 |

FOREIGN PATENT DOCUMENTS

| EP | 1 279 807 A1 | 1/2003 |
| JP | 10-030450 A | 2/1998 |

\* cited by examiner

*Primary Examiner*—Richard M. Lorence
(74) *Attorney, Agent, or Firm*—Harness, Dickey & Pierce, P.L.C.

(57) ABSTRACT

A decoupler (22) is provided for transferring rotary movement between an engine driven crankshaft (16) and a serpentine belt (20). The decoupler (22) has a rotary driving member (18, 36) and a rotary driven member (36, 18) coaxially mounted with the driving member for relative rotary movement therewith. A decoupling assembly (19) extends between the driving member (18, 36) and the driven member (36, 18). The decoupling assembly (19) selectively couples the driving and driven members (18, 36) when the driving member rotates relative to the driven member in a first coupling sense. The decoupling assembly (19) uncouples the driving member from the driven member when the driving member rotates relative to the driven member in a second sense opposite the first sense. A torsional vibration damper (80) is mounted for rotation with one of the driving and driven members (18, 36) to cancel some of the vibrations generated by the engine.

20 Claims, 3 Drawing Sheets

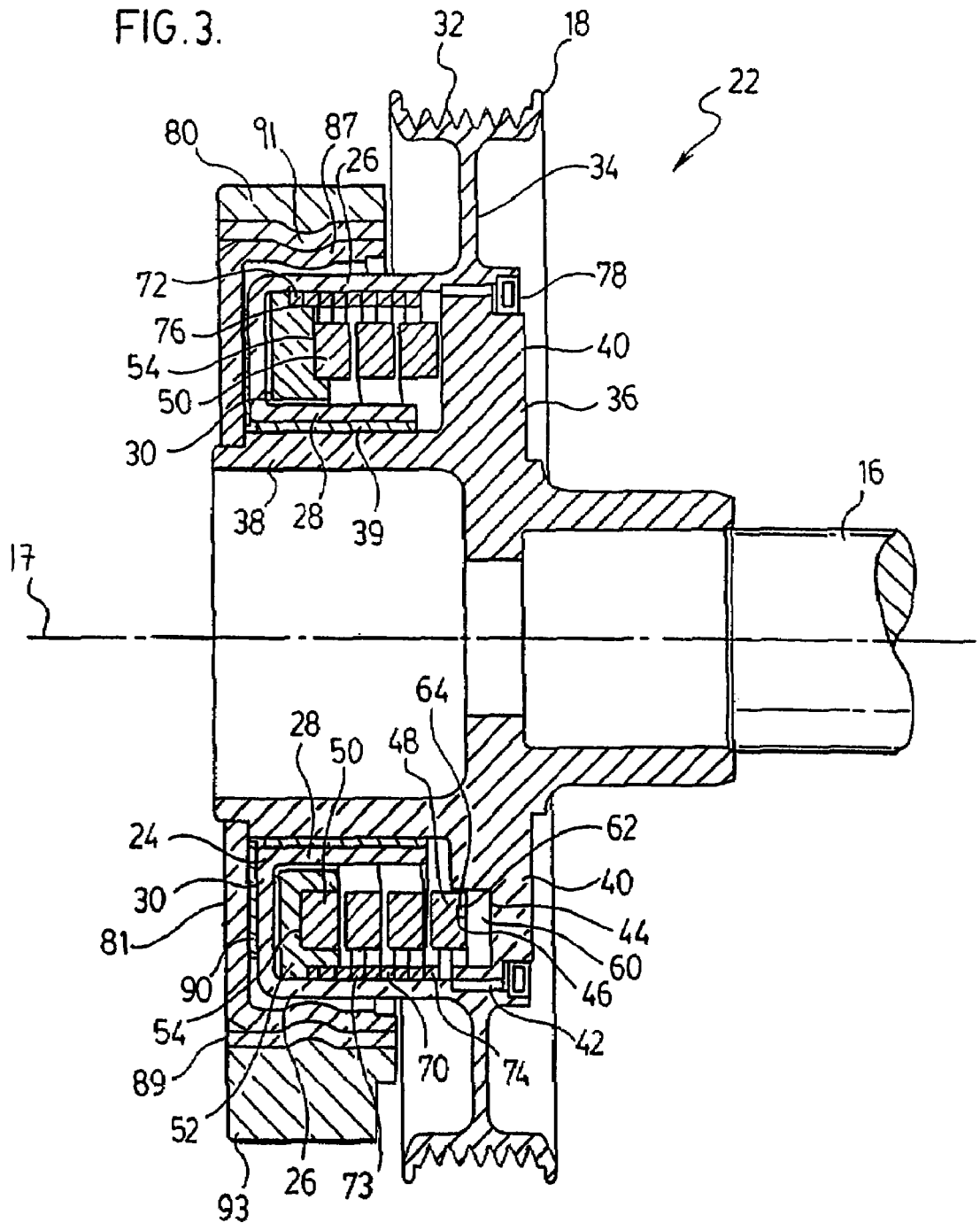

CRANKSHAFT TORQUE MODULATOR

CROSS-REFERENCE TO RELATED APPLICATIONS

This application is a national phase entry of PCT International Application No. PCT/CA2004/000145 filed Feb. 4, 2004, which claims priority to U.S. Provisional Patent Application No. 60/445,125 filed Feb. 4, 2003.

FIELD OF THE INVENTION

The invention relates to a crankshaft and belt drive assembly of an automotive vehicle, and more particularly, to a decoupling mechanism for the allowing the belt drive assembly to operate temporarily at a speed other than the crankshaft.

DESCRIPTION OF THE RELATED ART

It is widely known in an automotive vehicle engine to transfer a portion of the engine output to a plurality of belt driven accessories utilizing an endless serpentine belt. Typically, each belt driven accessory includes a pulley drivingly engaged with the belt and the belt is driven by a pulley coupled directly to the crankshaft.

It is also known to provide a decoupler assembly between the belt driven accessory and the pulley to allow the belt driven accessory to operate temporarily at a higher speed or "overrun" the pulley as the pulley oscillates with the speed of the engine. Examples of such decouplers are disclosed in the U.S. Pat. No. 6,083,130, issued to Mevissen et al. on Jul. 4, 2000 and the U.S. Pat. No. 5,139,463, issued to Bytzek etal. on Aug. 18, 1992.

However, it remains desirable to provide a decoupler assembly that allows the pulley of the crankshaft to operate temporarily at a higher speed or "overrun" the crankshaft as the speed of the engine oscillates during normal operation and provide a certain amount of vibration damping.

SUMMARY OF THE INVENTION

According to one aspect of the invention, a decoupler is provided for transferring rotary movement between an engine driven crankshaft and a serpentine belt. The decoupler has a rotary driving member and a rotary driven member coaxially mounted with the driving member for relative rotary movement therewith. A decoupling assembly extends between the driving member and the driven member. The decoupling assembly selectively couples the driving member and the driven member when the driving member rotates relative to the driven member in a first coupling sense. The decoupling assembly uncouples the driving member from the driven member when the driving member rotates relative to the driven member in a second sense opposite the first sense. A torsional vibration damper is mounted for rotation with one of the driving and driven members to cancel some of the vibrations generated by the engine.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a cross sectional view of the crankshaft decoupler assembly.

DETAILED DESCRIPTION OF THE PREFERRED EMBODIMENT

Figure 1:
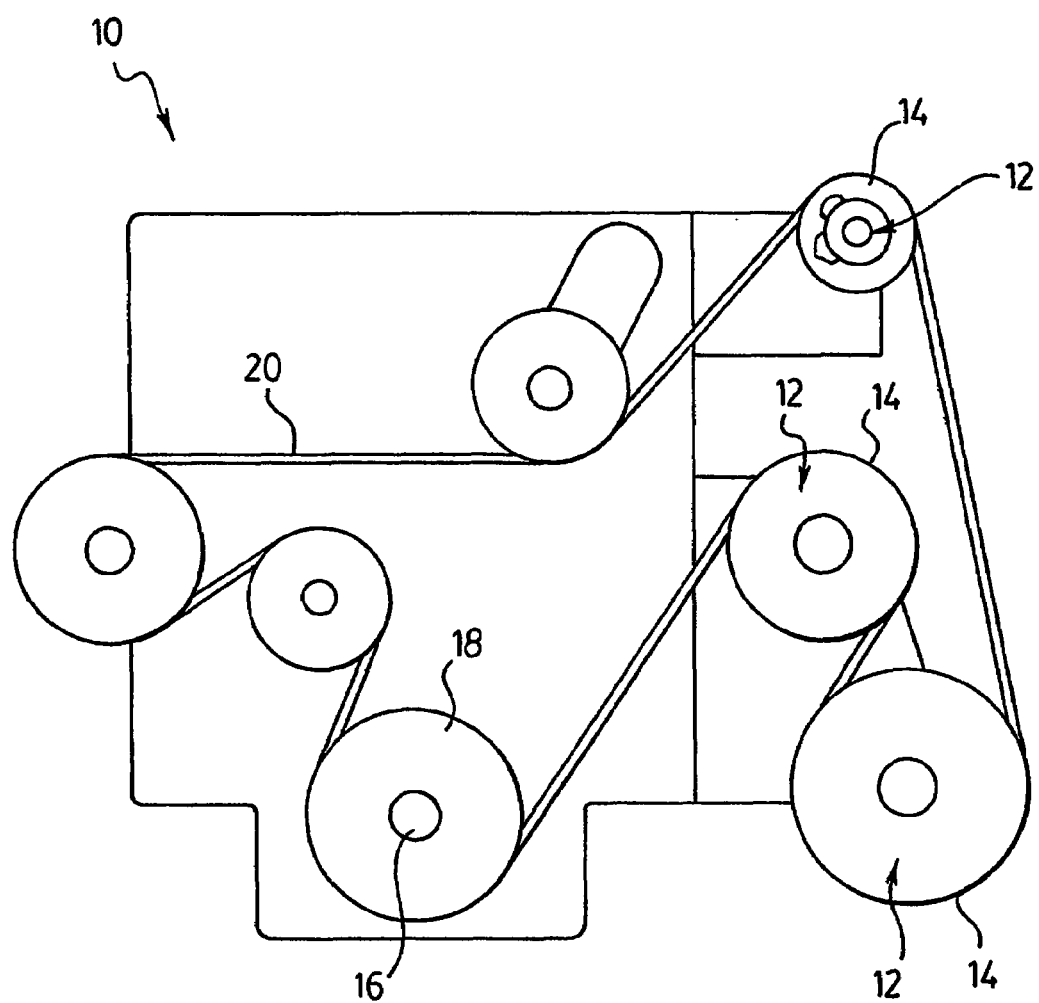
FIG. 1 is a front view of an engine incorporating a decoupler according to one aspect of the invention.

Referring to FIG. 1, an engine for an automotive vehicle is generally indicated at 10. The engine 10 includes a plurality of belt driven accessories 12. Each belt driven accessory 12 includes a pulley 14 for operating the belt driven accessory in response to rotation of the pulley 14. The engine 10 also includes a crankshaft 16, which generally provides the mechanical output resulting from the operation of the engine 10. A crankshaft pulley 18 is coupled to the crankshaft 16 and is rotatably driven by the crankshaft 16 for rotation about an axis 17 defined by the crankshaft 16. An endless serpentine belt 20 is seated about each pulley 14 of the belt driven accessories 12 and the pulley 18, such that each pulley 14 is rotatably driven by the rotation of the crankshaft pulley 18, which in turn, is driven by the crankshaft 16. Described in greater detail below, a decoupler 22 is operatively coupled between the crankshaft 16 and the belt 20 for allowing the pulley 18 to temporarily operate at a higher speed or "overrun" the crankshaft 16 as the rotational speed of the crankshaft 16 oscillates with the speed of the engine 10. The decoupler 22 also serves to dampen vibrations experienced between the crankshaft 16 and the pulley 18 that are associated with the operation of the engine 10.

Figure 2:
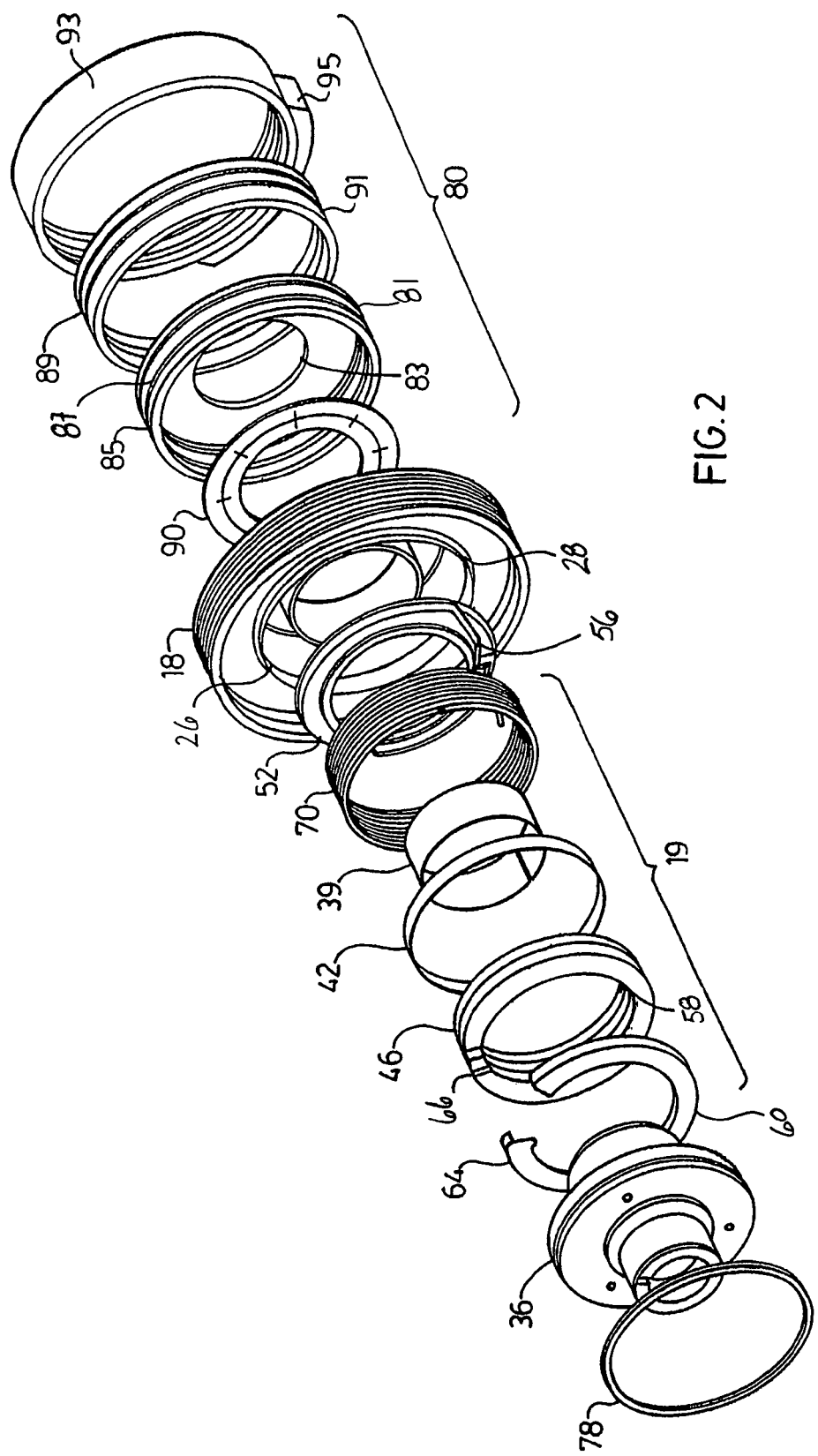
FIG. 2 is a perspective view of a decoupler assembly.

Referring to FIG. 2, the decoupler 22 includes the crankshaft pulley 18, a hub 36, a decoupling assembly 19 comprising a spring and one-way clutch assembly extending between the pulley 18 and the hub 36 and a torsional vibration damper 80 mounted on the hub 36. Preferably, the decoupling assembly 19 is mounted at least partially within the circumferential extent of the pulley 18. The torsional vibration damper 80 surrounds a portion of the decoupling assembly 19, enabling a more compact unit.

Referring to FIG. 3, pulley 18 includes an annular ring 24 having a U-shaped cross section defined by generally parallel outer 26 and inner 28 walls and a first connecting wall 30 extending radially therebetween.

The pulley 18 includes an annular outer rim 32 for seating the belt 20 therein. A flange 34 extends generally radially between the outer wall 26 and the outer rim 32.

The hub 36 is fixedly secured to the crankshaft 16 of the engine 10 and rotatably coupled to the pulley 18. The hub 36 includes a generally cylindrical body 38 extending along the axis 19 of the crankshaft 16. The body 38 is rotatably coupled to the inner wall 28 of the pulley 18. A first bushing 39 is disposed between the body 38 and the inner wall 28 to reduce friction therebetween due to relative rotational movement between the hub 36 and the pulley 18. The hub 36 includes a flange or disc portion 40 extending radially between the body 38 and the outer wall 26 of the pulley 18. The disc portion 40 is rotatably coupled to the outer wall 26 of the pulley 18. A second bushing 42 is disposed between the disc portion 40 and the outer wall 26 to reduce friction therebetween due to relative rotational movement between the hub 36 and the pulley 18. An annular groove or surface 44 is defined in the disc portion 40 due to the difference in diameter between the disc portion 40 and the body 38. The annular surface 44 opposes the first connecting wall 30 of the pulley 18. Alternatively, either of the first 39 or second 42 bushings can be replaced by a suitable roller bearing assembly for reducing friction between the hub 36 and the pulley 18.

The one-way clutch assembly comprises a torsional spring 46 coupled with a clutch spring 70. Torsional spring 46 extends axially between the annular surface 44 of the hub 36 and the first connecting wall 30 of the pulley 18. The torsional spring 46 extends helically between a hub end 48 and a pulley end 50. The torsional spring 46 preferably has a circular cross section, but can also have any non-circular shaped cross section. A carrier disc 52 is disposed between the pulley end 50 of the torsional spring 46 and the first connecting wall 30 of pulley 18. Preferably, the carrier 52 is made of plastic, but can be made from any suitable materials, such as ceramic, metal, or composite materials. The carrier 52 is generally ring-shaped and is rotatably coupled between the outer 26 and inner 28 walls and the first connecting wall 30 of the pulley 18. A first ramped or helical surface 54 is formed in the carrier 52 generally opposing the annular surface 44 of the hub 36. The first helical surface 54 supports the pulley end 50 of the torsional spring 46. A first tab 56 extends outwardly from the first helical surface 54 and projects into a corresponding first notch 58 formed in the pulley end 50 of the torsional spring 46. Engagement between the first tab 56 and the first notch 58 prevents relative rotational movement or ramping of the torsional spring 46 relative to the carrier 52. Similarly, a spring support 60 is disposed between the hub end 48 of the torsional spring 46 and the annular surface 44 of the hub 36. The spring support 60 is fixedly secured to the annular surface 44. A second ramped or helical surface 62 is formed in the spring support 60 generally opposing the first connecting wall 30. The second helical surface 62 supports the hub end 48 of the torsional spring 46. A second tab 64 extends outwardly from the second helical surface 62 and projects into a corresponding second notch 66 formed in the hub end 48 of the torsional spring 46. Engagement between the second tab 64 and the second notch 66 prevents relative rotational movement or ramping of the torsional spring 46 relative to the spring support 60. Alternatively, the second helical surface 62 is formed in the annular surface 44 of the hub 36 in place of the spring support 60 and the second tab 64 extends outwardly from the second helical surface 62 formed in the hub 36.

Alternatively, a split(not shown), as indicated by a dotted-line in FIG. 2, can be formed in the carrier 52 to help the carrier 52 accommodate loads associated with the rotation of the decoupler assembly 22.

Clutch spring 70 extends axially between the carrier 52 and the annular surface 44 of the hub 36. The clutch spring 70 includes a plurality of coils 73 extending helically between a proximal end 72 and a distal end 74. The proximal end 72 of the clutch spring 70 is fixedly retained in a corresponding groove 76 formed in the carrier 52 to prevent relative rotational movement of the clutch spring 70 relative to the carrier 52. Preferably, the clutch spring 70 is formed from an uncoated, spring steel material and has a non-circular cross-section to improve frictional contact. Alternatively, the clutch spring 70 may also be formed from a coated spring steel material, such as a coating applied to the steel to enhance lubrication and reduce damage to the clutch surfaces induced by excessive friction and heat generation. Also, the clutch spring 70 may have a circular cross-section of either a coated or uncoated, spring steel material. Most preferably, the cross-section of clutch spring 70 is rectangular or square. The plurality of coils 73 is press-fitted into frictional engagement with the outer wall 26 of the pulley 18. Preferably, a lubricant is applied to minimize wear between the plurality of coils 73 of the clutch spring 70 and the outer wall 26. An elastomeric ring seal 78 is disposed between the disc portion 40 of the hub 36 and the outer wall 26 of the pulley 18 to prevent leakage of lubricant therebetween.

A torsional vibration damper 80 is fixedly secured to the body 38 of the hub 36 adjacent the first connecting wall 30 of the pulley 18 for dampening vibrations experienced at the crankshaft 16 associated with the operation of the engine 10. The damper comprises a cup-shaped mounting hub 81 with a central opening 83. Mounting hub 81 is press fitted onto hub 36 to rotate therewith. The mounting hub 81 has an outer circumferentially extending rim 85 having a circumferentially extending groove 87 therein. An elastomeric ring 89 extends about the outer rim 85 and has a complementary groove 91 that fits with groove 87 of mounting hub 81. Inertia ring 93 extends about elastomeric ring 89 and in frictional engagement therewith. Alternatively, elastomeric ring 89 is bonded to the mounting hub 81 and the outer rim 85. Still further, the elastomeric ring 89 can be molded in place and subsequently vulcanized to bond the assembly together.

Optionally, ring 93 has a lobe 95 that provides an offset mass that operates to move the center of mass of the decoupler 22 back to the axis of rotation. Additionally, the mass of the lobe 95 can be enlarged or moved to cancel engine vibration. The additional size and location of the lobe 95, if required, is normally specified by the engine manufacturer.

A thrust washer 90 is disposed between the torsional vibration damper 80 and the first connecting wall 30 of the pulley 18 for axially biasing the pulley 18 towards the hub 36. The axial bias of the thrust washer 90 helps to maintain the first tab 56 of the carrier 52 and the second 64 tab of the spring support 60 in engagement with the first 58 and second 66 notches of the torsional spring 46, respectively.

In operation, the engine 10 is started, which causes the crankshaft 16 to rotate about the axis 17 in a driven direction. The hub 36 rotates with the crankshaft 16 and accordingly is the driving rotary member. Rotational movement of the hub 36 is transferred between the spring support 60 and the carrier 52 by the torsional spring 46. The torsional spring 46 also dampens or isolates the pulley 18 and the hub 36 from vibrations associated with the operation of the engine 10 and the belt driven accessories 12. The clutch spring 70 rotates with the carrier 52 to provide positive engagement between the hub 36 and the pulley 18. Pulley 18 is the driven rotary member.

During acceleration of the engine 10, the hub 36, spring support 60, torsional spring 46, carrier 52 and clutch spring 70 are urged to rotate relative to the pulley 18 in a first coupling sense. The acceleration of the hub 36 relative to the pulley 18 increases frictional engagement between the plurality of coils 73 of the clutch spring 70 and the outer wall 26 of the pulley 18. The clutch spring 70 is helically coiled such that the friction between the outer wall 26 of the pulley 18 and at least one of the plurality of coils 73 causes the plurality of coils 73 of the clutch spring 70 to expand radially outwardly toward the outer wall 26. Eventually all of the plurality of coils 73 becomes brakingly engaged with the outer wall 26 such that the rotational movement of the hub 36 is fully directed toward the rotational movement of the pulley 18. Additionally, centrifugal forces help to retain the plurality of coils 73 in braking engagement with the outer wall 26 of the pulley 18. The centrifugal forces also helps to retain the lubricant between the outer wall 26 and the plurality of coils 73.

When the engine 10 decelerates, the hub 36, spring support 60, torsional spring 46, carrier 52 and clutch spring 70 are urged to rotate relative to the pulley 18 in an uncoupling sense opposite the first coupling sense. The pulley 18 rotatably overruns the hub 36 due to the inertial mass associated with the pulley 18 and the belt driven accessories 12. More specifically, the higher rotational speed of the pulley 18 relative to the hub 36 causes the plurality of coils 73 of the clutch spring 70 to contract radially relative to the outer wall 26 of the pulley 18. Braking engagement between the plurality of coils 73 and the outer wall 26 is relieved, which allows the pulley 18 to overrun the hub 36. Some or all of the plurality of coils 73 may remain frictionally engaged with the outer wall 26, while still allowing the pulley 18 to overrun the hub 36. When the engine 10 re-accelerates, the plurality of coils 73 brakingly re-engages the outer wall 26 to cause acceleration of the pulley 18 with the hub 36.

The torsion vibration damper 80 is directly coupled with one of the rotary members for rotation therewith. In the preferred embodiment, the vibration damper 80 is coupled to the hub 36. Accordingly, the vibration damper acts to smooth torsional vibrations generated by the firing of the engine and transmitted through the crankshaft. The inertia ring 93, acting through the elastomeric ring 89, acts as a flywheel, minimizing speed variations.

The decoupler 22 of the present invention has been described in terms of being mounted on the end of a crankshaft. However, it is now apparent to those skilled in the art that the decoupler 22 could be mounted on a rotating shaft of any of the accessories that are driven by an accessory belt drive, such as an alternator. In the case of an alternator, the pulley 18 becomes the driving member and the hub 36 becomes the driven member. The winding direction of the torsional spring and one-way clutch is reversed.

Although the decoupler 22 is described above as part of an internal combustion engine 10, it should be appreciated that the decoupler 22 can be implemented in any rotary or pulley-type belt drive system, such as a generator or a conveyer belt system, or in any system of rigid shafts with pulley or misalignment couplings where a hub load is not necessarily applied.

It should also be appreciated that the pulley 18 can be adapted to accommodate any type of belt, such as a plastic or rubber flat belt, multi-rib belt, a "V" belt, or a synchronous belt. The pulley 18 can also be adapted to accommodate a flat steel, plastic or rubber belt, such as used in a continuously variable transmission, for example, or a multi-link chain constructed of plastic, steel or equivalent, or a cable assembly comprising of rope, steel, or braided wire.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A decoupler comprising:
a rotary driving member;
a rotary driven member coaxially mounted with said driving member for relative rotary movement therewith;
a decoupling assembly extending between said driving member and said driven member, said decoupling assembly selectively coupling said driving member and said driven member when said driving member rotates relative to said driven member in a first coupling sense and said decoupling assembly uncouples said driving member from said driven member when said driving member rotates relative to said driven member in a second sense opposite said first sense;
said decoupling assembly including a spring and a one-way clutch mechanism, said spring is a torsional spring having a first end engaging one of said driven and driving members and a second end engaging a carrier, and said one-way clutch mechanism including a clutch spring having a first end engaging said carrier and a plurality of coils helically extending frictionally engaging the other of said driven and driving members;
said clutch spring including a coating applied thereto; and
a torsional vibration damper mounted for rotation with one of said driving member and said driven member.

2. A decoupler as set forth in claim 1 wherein said spring and one-way clutch mechanism are arranged in series.

3. A decoupler as set forth in claim 2 wherein said torsional vibration damper is mounted in a surrounding relation with said decoupling assembly.

4. A decoupler as set forth in claim 3 wherein said torsional vibration damper comprises a mounting hub having a circumferentially extending rim, an elastomeric ring mounted on said rim and an inertia ring mounted on said elastomeric ring.

5. A decoupler as set forth in claim 4 wherein said inertia ring has a lobe positioned to move a center of mass of said decoupler to be along an axis of rotation of the decoupler.

6. A decoupler as set forth in claim 5 wherein said mounting hub is press fitted onto said driving member.

7. A decoupler as set forth in claim 6 wherein said plurality of coils expand upon relative rotation in the first coupling sense to increase friction engagement and said plurality of coils contract upon relative rotation in the second uncoupling sense.

8. A decoupler as set forth in claim 7 wherein said ends of said torsional spring interlocks with said one of said driven and driving members and said carrier.

9. A decoupler as set forth in claim 8 wherein said clutch spring has a rectangular cross-section.

10. A decoupler as set forth in claim 8 wherein said clutch spring has a square cross-section.

11. A decoupler as set forth in claim 8 wherein said clutch spring has a circular cross-section.

12. A decoupler as set forth in claim 2 wherein one of said driven and driving members has an inner periphery defining an annular ring having U-shaped cross-section and said decoupling assembly is mounted within said annular ring.

13. A decoupler as set forth in claim 12 wherein the other of said driven and driving members has a cylindrical body and a flange extending therefrom, said cylindrical body and said flange rotatably supporting inner and outer walls of said annular ring.

14. A decoupler as set forth in claim 13 wherein said torsional vibration damper is mounted in a surrounding relation with said annular ring.

15. A decoupler as set forth in claim 14 wherein said torsional vibration damper retains said decoupling assembly between said driving and driven members.

16. A decoupler as set forth in claim 15 wherein said plurality of coils expand upon relative rotation in the first coupling sense to increase friction engagement and said plurality of coils contract upon relative rotation in the second uncoupling sense.

17. A decoupler as set forth in claim 16 wherein said ends of said torsional spring interlocks with said one of said driven and driving members and said carrier.

18. A decoupler assembly as set forth in claim 17 wherein said plurality of coils engages an inner periphery of an outer wall of said annular ring.

19. A decoupler as set forth in claim 18 wherein said driving member is a hub and said driven member is a pulley and said torsional vibration damper is mounted to said hub.

20. A decoupler as set forth in claim 1 further comprising a lubricant is disposed between said plurality of coils and the other of said driven and driving members.

* * * * *

UNITED STATES PATENT AND TRADEMARK OFFICE
CERTIFICATE OF CORRECTION

PATENT NO. : 7,591,357 B2
APPLICATION NO. : 10/542625
DATED : September 22, 2009
INVENTOR(S) : Antchak et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 60 days.

Signed and Sealed this

Twenty-first Day of September, 2010

David J. Kappos
*Director of the United States Patent and Trademark Office*